United States Patent Office 3,170,917
Patented Feb. 23, 1965

3,170,917
DEAMINATION OF HETEROCYCLIC AMINO CONTAINING COMPOUNDS
Louis Laufer, Bronx, and Bernard William Town, Mount Vernon, N.Y., assignors to Schwarz Bioresearch, Inc., Orangeburg, N.Y., a corporation of New York
No Drawing. Filed Sept. 24, 1962, Ser. No. 225,839
4 Claims. (Cl. 260—211.5)

This invention relates to the deamination of aminated organic compounds. More particularly the invention relates to the deamination of heterocyclic compounds classified as purines or pyrimidines and having amine groups (aminopurines and aminopyrimidines), or glycosides thereof, or phosphate esters of such glycosides or polymers thereof, such deamination being carried out without the use of extraneous electrolytes.

An aminopyrimidine is a heterocyclic compound having a monocyclic structure having an amine group. An aminopurine is a heterocyclic compound having a condensed dicyclic structure composed of pyrimidine and imidazole rings with an amine group on the pyrimidine ring. Within the context of the present invention the term "nucleic acid" includes ribonucleic acid (RNA) and deoxyribonucleic acid (DNA). The term "nucleic acid derivatives" refers to the bases: nucleosides, deoxynucleosides, nucleotides and deoxynucleotides as well as compounds which are derivaties of these sub-units of the nucleic acids.

Examples of aminopyrimidines are:
(1) Cytosine (or 4-amino-2(1-H) pyrimidinone):

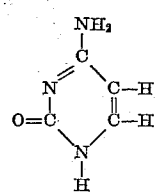

(2) Divicine:

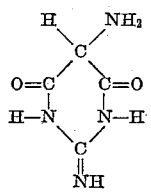

Examples of aminopurines are:
(1) Adenine (or 6-aminopurine):

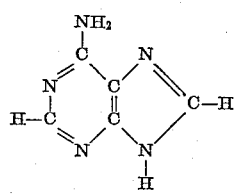

(2) Guanine (or 2-amino-6-oxypurine):

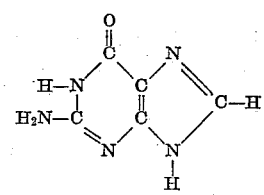

Examples of nucleosides having an amine group are:
(1) Adenosine or adenine riboside):

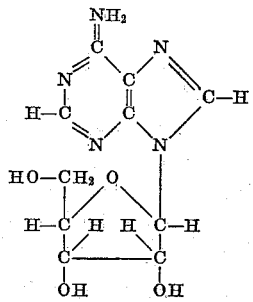

(2) Guanosine (or guanine riboside):

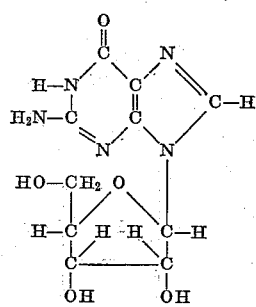

(3) Cytidine:

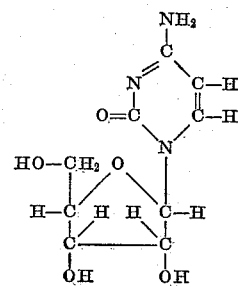

Examples of deoxynucleosides having an amine group are:
(1) Deoxyadenosine:

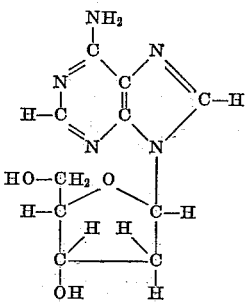

(2) Deoxyguanosine:

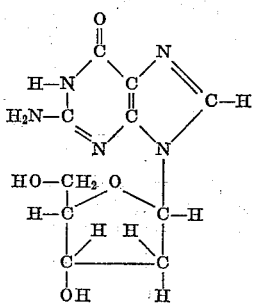

(3) Deoxycytidine:

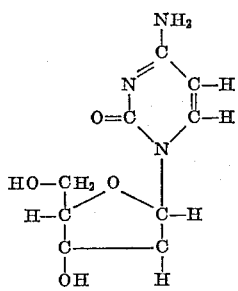

A nucleotide is a phosphoric ester of a nucleoside, and may be a nucleoside monophosphate or a nucleoside polyphosphate. Examples of nucleoside monophosphates having an amine group are:

(1) Adenosine 5'-phosphoric acid (or muscle adenylic acid or adenosine 5'-monophosphate):

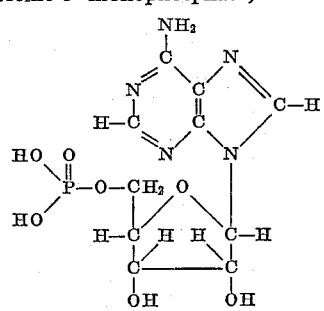

(2) Adenosine 3'-phosphoric acid (or yeast adenylic acid or adenosine 3'-monophosphate):

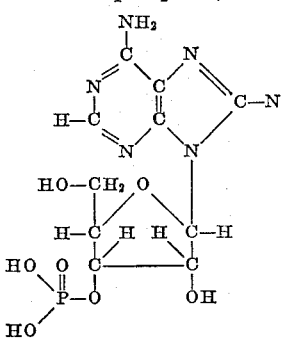

(3) Guanosine 5'-phosphate:

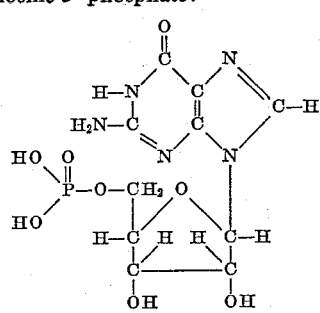

(4) Cytidine 5'-phosphate:

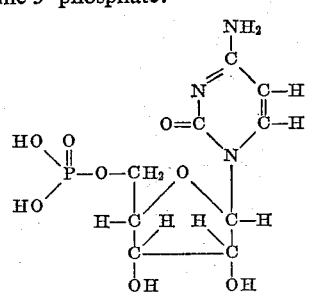

Examples of nucleoside polyphosphates having an amine group are:

(1) Adenosine 5'-pyrophosphoric acid (or adenosine diphosphate):

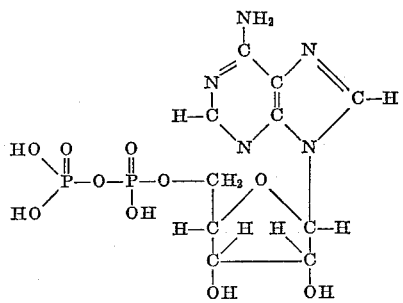

(2) Adenosine 5'-triphosphoric acid (or adenosine 5'-triphosphate):

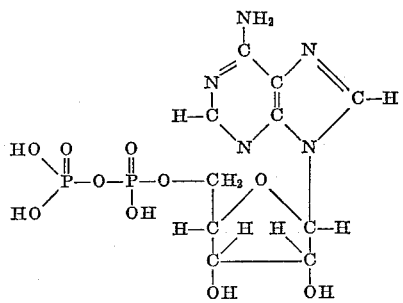

(3) Guanosine 5'-diphosphate.
(4) Guanosine 5'-triphosphate.
(5) Cytidine 5'-diphosphate.
(6) Cytidine 5'-triphosphate.

Many of the above enumerated organic compounds having an amine group (as well as other like compounds) have been deaminated by well known procedures utilizing nitrous acid ($HNO_2$) as the deaminating agent to yield amine-free compounds. For instance, guanine:

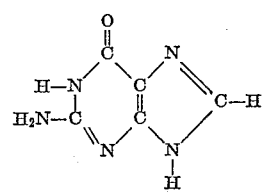

has been treated with nitrous acid to obtain xanthine (2,6-dioxypurine):

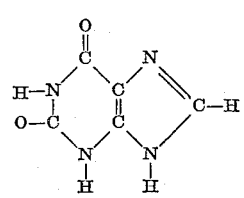

Further, xanthosine has been formed from guanosine by the deaminating action of nitrous acid. Following recognized procedures guanosine is dissolved in a hot solution of sodium nitrite in water. On cooling, the guanosine separates in lumps which are broken up. Acetic acid is added and the mixture is agitated until all of the guanosine has gone into solution. Water is added and the solution is cooled. Over a period of time xanthosine crystallizes out and may be recovered by filtering.

Deamination of muscle adenylic acid:

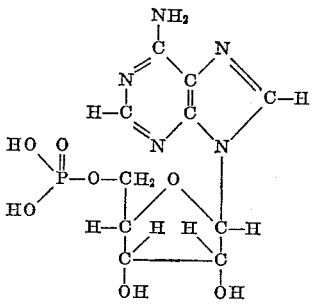

by means of nitrous acid has yielded inosinic acid:

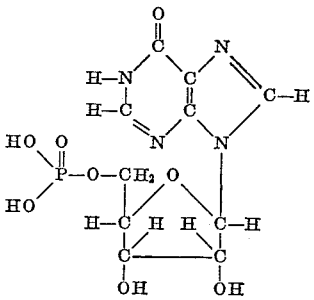

Following the above procedure for deaminating guanosine, guanylic acid:

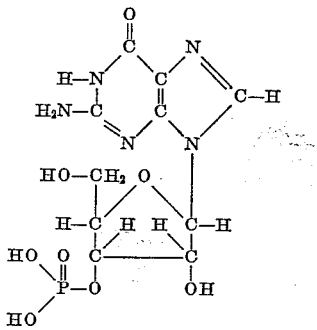

has been treated with nitrous acid to obtain xanthylic acid:

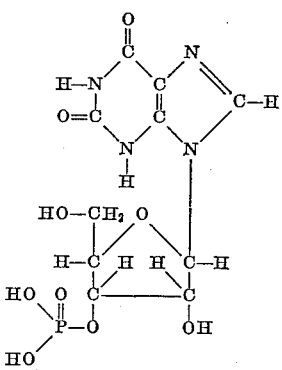

Although deamination of the above referred to heterocyclic compounds has been accomplished using nitrous acid, difficulties are encountered because of the instability of nitrous acid. The nitrous acid ($HNO_2$) undergoes a dismutation to yield nitric acid ($HNO_3$) and nitric oxide (NO) whereby two competing reactions take place. For instance, during the deamination of adenosine 5'-phosphoric acid (AMP) using nitrous acid the following two reactions occur:

(1) $3HN_2 \rightleftharpoons H^+ + NO_3^- + H_2O + 2NO$ (2) $AMP(NH_2) + HNO_2 \rightarrow AMP(OH) + H_2O + N_2$ Reaction (2) facilitates the deamination of $AMP(NH_2)$ where the concentration of $AMP(NH_2)$ is high. Reaction (1) should be inhibited by high ($H^+$), but the deamination of the $NH_2$ in reaction (2) is impaired by the high ($H^+$) required to inhibit reaction (1).

The common procedure of neutralizing the solutions during treatment with sodium hydroxide and the sodium nitrite and acetic or other acid components commonly used in such deaminating solutions result in the formation of sodium salts which make it difficult to remove the product. Further, deamination of heterocyclic compounds of the type described using nitrous acid as the deaminating agent has required long reaction times and has resulted in relatively low and uneconomical yields of amine-free compounds.

It is an object of the present invention to provide a process for deaminating heterocyclic compounds having amine groups which result in improved yields of deaminated compounds at reduced reaction times.

It is another object of the present invention to provide a process for deaminating heterocyclic compounds having amine groups which is carried out at substantially normal temperatures and which result in improved yields of deaminated compounds at reduced reaction times.

It is a further object of the invention to provide a process for deaminating heterocyclic compounds having amine groups which process does not require relatively hot reaction solutions or the use of extraneous electrolytes in the reaction solution.

The above and other objects and features of the invention will appear more fully from the following description.

According to the present invention, a process for the deamination of heterocyclic aminocompounds comprises treating an aqueous solution of an aminocompound of the type described with nitrous acid anhydride ($N_2O_3$) (in excess of stoichiometric requirements for reaction) in the presence of cupric ions. The amount of cupric ions is critical, it having been discovered that trace amounts of cupric ion catalyze the deamination reaction whereas higher concentrations of cupric ion inhibit deamination. It has also been found that some of the aminocompounds treated in accordance with the invention chelate copper and therefor it becomes necessary to treat the amine-free compounds which have become cupric. Such additional treatment may involve a decomposition reaction utilizing $H_2S$ with the reaction solution.

The following examples are given to illustrate the invention and are not to be construed as limiting. The examples relate to the deamination of a number of heterocyclic compounds having amine groups which are considered to be representative of the types of aminated organic compounds which may be deaminated in accordance with the invention.

EXAMPLE 1.—DEAMINATION OF ADENOSINE (AO)

The deamination of adenosine (AO) to form inosine (IO) using nitrous acid anhydride gas as the deaminating agent was performed in two experiments to illustrate the catalyzing action of cupric ion. In Experiment A (results in Table A) one gram of AO (free of $Cu^{++}$) in 25 ml. of water was treated with nitrous anhydride at a rate of 120 bubbles per minute (12 cc. per min.) at room temperature in a flask with agitation. In Experiment B (results in Table A below) one gram of AO in 25 ml. of water was treated with nitrous anhydride under identical conditions, but with 1 mg. of $Cu^{++}$ ion added to the reaction solution. Percents of IO were calculated from Optical Density (OD) readings taken during each experiment at corresponding times.

Table A

| Experiment A | | | | Time, Minutes | Experiment B | | | |
|---|---|---|---|---|---|---|---|---|
| $OD_{250}$ | $OD_{260}$ | $OD_{250}/OD_{260}$ | IO, Percent | | $OD_{250}$ | $OD_{260}$ | $OD_{250}/OD_{260}$ | IO, Percent |
| .52 | .62 | .84 | 7.0 | 5 | .75 | .93 | .81 | 4.0 |
| .65 | .80 | .81 | 4.0 | 15 | .82 | .88 | .90 | 13.0 |
| .88 | 1.04 | .84 | 6.7 | 30 | .90 | .80 | 1.12 | 38.0 |
|  |  |  |  | 40 | .85 | .67 | 1.28 | 56.0 |
| .86 | .95 | .90 | 13.0 | 55 |  |  |  |  |
|  |  |  |  | 65 | .91 | .55 | 1.66 | 100.0 |
| .92 | .92 | 1.00 | 24.0 | 70 |  |  |  |  |
| .92 | .89 | 1.02 | 27.0 | 100 |  |  |  |  |

Experiments C through G were carried out under the same conditions as Experiment B except that instead of adding 1 mg. of $Cu^{++}$ ion, 1 mg. of other reactive metals were used as indicated in Table B below. Percents of IO (after a reaction time in each case of 45 minutes) were noted for comparison with AO to IO deamination conversion in the presence of $Cu^{++}$ ion.

Table B

| Experiment | Metal Ion | Percent IO in 45 minutes |
|---|---|---|
| C | $Fe^{++}$ | 23 |
| D | $Mn^{++}$ | 22 |
| E | $Zn^{++}$ | 22 |
| F | $Pd^{++}$ | 30 |
| G | $Ni^{++}$ | 23 |

Experiments H through N were carried out to illustrate the effect on the conversion rate of AO to IO by deamination with nitrous acid anhydride using varying concentrations of $Cu^{++}$ ion. In each of such experiments the temperature of the reaction solution (one gram of AO in 25 ml. of water) was maintained at 37° C. and times noted for complete deamination of AO to IO. The results of these experiments appear in Table C below.

Table C

| Experiment | $Cu^{++}$ ion | Time for 100% Deamination, Minutes |
|---|---|---|
| H | 2.0 mg./gram AO | 96 |
| I | 1.0 mg./gram AO | 100 |
| J | 0.5 mg./gram AO | 80 |
| K | 0.1 mg./gram AO | 75 |
| L | 25 gamma/gram AO | 50 |
| M | 10 gamma/gram AO | 39 |
| N | 5 gamma/gram AO | 65 |

From Experiments A and B (Table A) it can readily be seen that AO can be deaminated in accordance with the process of the present invention (Experiment B) to form IO in substantially less time. Experiments C through G (Table B) when compared with Experiment B illustrate that AO deamination to IO using metallic ions other than $Cu^{++}$ does not result in a significant increase in the deamination rate using nitrous anhydride as the deaminating agent. Experiments H through N (Table C) indicate that for AO conversion to IO using nitrous anhydride as the deaminating agent and adding cupric ion to the reaction solution, optimum results are obtained using about 10 gamma $Cu^{++}$ ion per gram of AO.

EXAMPLE 2.—DEAMINATION OF ADENOSINE 5'-MONOPHOSPHATE (AMP)

The deamination of adenosine 5'-monophosphate (AMP) to form inosinic acid (IMP) using nitrous anhydride gas as the deaminating agent was performed using a trace amount of cupric ion to catalyze the deamination reaction. In the experiment a mixture of 25 grams of AMP in 200 ml. of water (pH 4.1) was neutralized to pH 7.8 with 9.5 ml. (14 N) NaOH. To this solution was added 250 gamma of cupric ion as cupric acetate and the final solution was treated with nitrous anhydride at 35° C. at a rate of approximately 100 bubbles per minute (10 cc. per min.). The reaction mixture was maintained under agitation and was found to be exothermic. Percents of IMP were calculated from Optical Density (OD) readings taken during the experiment. Table D below indicates the percent of IMP for given reaction times.

Table D

| Time, Minutes | $OD_{250}$ | $OD_{260}$ | $OD_{250}/OD_{260}$ | IMP, Percent |
|---|---|---|---|---|
| 5 | .95 | 1.20 | .79 | 1 |
| 20 | .99 | 1.20 | .83 | 6 |
| 30 | 1.00 | 1.14 | .87 | 11 |
| 45 | 1.00 | .90 | 1.11 | 37 |
| 70 | 1.12 | .80 | 1.40 | 69 |
| 85 | 1.12 | .74 | 1.50 | 80 |
| 100 | 1.06 | .66 | 1.61 | 92 |
| 120 | 1.09 | .64 | 1.70 | 100 |

Although the foregoing specification comprises preferred embodiments of the invention, it is to be understood that the invention is not limited to the exact details shown and described, and that variations and modifications may be made in conventional manner without departing from the scope of the invention as defined in the appended claims.

We claim:

1. A process for deaminating heterocyclic organic compounds selected from the group consisting of aminopyrimidines and aminopurines, pyrimidine glycosides and purine glycosides having an amine group on the pyrimidine ring, and pyrimidine glycoside phosphate esters and purine glycoside phosphate esters having an amine group on the pyrimidine ring, which comprises treating an aqueous solution containing said heterocyclic organic compound with nitrous acid anhydride gas in an amount in excess of stoichiometric requirements in the presence of cupric ions in an amount between about 5 gamma to about 25 gamma of cupric ions per gram of said heterocyclic organic compound in said aqueous solution.

2. A process for deaminating heterocyclic organic compounds selected from the group consisting of aminopyrimidines and aminopurines, pyrimidine glycosides and purine glycosides having an amine group on the pyrimidine ring, and pyrimidine glycoside phosphate esters and purine glycoside phosphate esters having an amine group on the pyrimidine ring, which comprises treating an aqueous solution containing at least 2% by weight of said heterocyclic organic compound with nitrous acid anhydride gas in an amount in excess of stoichiometric requirements in the presence of cupric ions in an amount between about 5 gamma to about 25 gamma of cupric ions per gram of said heterocyclic organic compound in said aqueous solution.

3. The process for deaminating heterocyclic organic compounds as claimed in claim 2 in which the amount of cupric ions present in the aqueous solution is about 10 gamma of cupric ions per gram of the heterocyclic compound in the aqueous solution.

4. A process for deaminating heterocyclic organic compounds selected from the group consisting of aminopyrimidines and aminopurines, pyrimidine glycosides and purine glycosides having an amine group on the pyrimidine ring, and pyrimidine glycoside phosphate esters and purine glycoside phosphate esters having an amine group on the pyrimidine ring, which comprises treating an aqueous solution containing said heterocyclic organic compound with nitrous acid anhydride gas in an amount in excess of the amount necessary to deaminate substantially all of said compound so as to form a reaction solution including an amine-free heterocyclic compound and being substantially free of said original compound, said treatment being carried out in the presence of cupric ions in an amount between about 5 gamma to about 25 gamma of cupric ions per gram of said original heterocyclic compound in said aqueous solution.

References Cited in the file of this patent

UNITED STATES PATENTS 3,049,536   Reiff et al. _____ Aug. 14, 1962